United States Patent [19]

Kunze et al.

[11] 4,160,487
[45] Jul. 10, 1979

[54] ENGINE COOLING SYSTEM FOR AN AGRICULTURAL VEHICLE

[75] Inventors: Dieter Kunze, Wehrsdorf; Ernst Leonhardt, Buatzen; Christian Noack, Guttau, all of German Democratic Rep.

[73] Assignee: VEB Kombinat Fortschritt Landmaschinen, Neustadt in Sachsen, German Democratic Rep.

[21] Appl. No.: 865,926

[22] Filed: Dec. 30, 1977

[30] Foreign Application Priority Data

Dec. 31, 1976 [DD] German Democratic Rep. ... 196733

[51] Int. Cl.² ............................................. B60K 11/04
[52] U.S. Cl. ............................... 180/68 R; 123/41.04; 165/119; 180/54 A
[58] Field of Search ................. 180/54 A, 68 P, 68 R, 180/69 R; 123/41.04; 165/119; 56/DIG. 8, 1

[56] References Cited

U.S. PATENT DOCUMENTS

| | | | |
|---|---|---|---|
| 2,788,775 | 4/1957 | Steiner | 180/54 A |
| 2,896,594 | 7/1959 | Ashton | 123/41.04 |
| 3,087,563 | 4/1963 | Fisher | 180/68 P |
| 3,344,854 | 10/1967 | Boyajian | 180/68 P |
| 3,921,603 | 11/1975 | Bentz et al. | 180/54 A |
| 4,064,934 | 12/1977 | Kolthoff, Jr. et al. | 123/41.04 |

FOREIGN PATENT DOCUMENTS 1425464  2/1976  United Kingdom ..................... 165/119

Primary Examiner—David M. Mitchell
Attorney, Agent, or Firm—Karl F. Ross

[57] ABSTRACT

A cooling system for the power plant of a self-propelled forage harvester or field chopper, generally located in the rear thereof, comprises an air chamber communicating with the atmosphere through laterally disposed filter screens and water-cooling radiators and through pairs of conical half-shells disposed point-symmetrically about ventilating fans integral with a unidirectionally rotatable shaft extending longitudinally in an opening in the top wall of the chamber. The shells, rigid with a support manually pivotable about the power-plant-driven shaft, normally direct air flow through the fans from the air chamber but may be rotated 180° by a vehicle operator to temporarily reverse the air flow and pressurize the chamber, thus forcing air out through the radiators and filter screens, cleaning them of clogging debris collected during normal operation of the vehicle. Sealer strips provided around the openings in the air chamber for minimizing leakage.

7 Claims, 5 Drawing Figures

1

ENGINE COOLING SYSTEM FOR AN AGRICULTURAL VEHICLE

FIELD OF THE INVENTION

My present invention relates to a motor-cooling system for a self-propelled vehicle. In particular, my invention relates to an adjustable deflector for reversibly directing air flow through radiators in such a system.

BACKGROUND OF THE INVENTION

Radiators and filter screens in the cooling system of farming and forestry vehicles become blocked with debris such as bits of straw in the course of normal use necessitating, in a former state of the art, frequent work-stoppage interruptions for cleaning away the debris, otherwise risking damage to the engine through overheating. Various solutions involving a reversal in air flow have been proposed to alleviate this problem. One such solution is to change the direction of rotation of a ventilating fan. This, however, requires an inevitably expensive reversible transmission. Another solution comprising a reorientation of fan blades becomes increasingly difficult to technically implement as increasing numbers of fans are concerned. Hinged ventilator flaps represent yet another solution. With the direction of fan rotation remaining the same, the flaps are alternately opened and closed to redirect air drawn by the blowers. The auxiliary equipment necessary to operate the flaps is generally disturbance-prone and space-consuming, while sealing problems lead to relatively high air leakage. An important disadvantage of the hinged-flaps solution is that it cannot be universally utilized.

OBJECTS OF THE INVENTION

An object of my invention is to provide a reversible-air-flow motor-cooling system which is easy and inexpensive to install and operate and which is utilizable in vehicles propelled by high-power motors.

SUMMARY OF THE INVENTION

A cooling system for a self-propelled vehicle such as a forage harvester or field chopper comprises, according to my invention, an air chamber carried by a vehicle body and provided with a first opening substantially coextensive with a radiator permeable by a stream of air and a second opening traversed by a rotatable fan. A funnel or deflector at least partially surrounds the fan for directing air flow therethrough, the funnel being pivotable about the fan for alternately pressurizing and depressurizing the air chamber. A conduit for the circulation of a coolant extends from the radiator to a motor supported by the body, while drive means are provided for rotating the fan.

According to a feature of my invention, the fan is an axial fan and the funnel includes a pair of air deflectors forming an upstream opening and a downstream opening disposed on opposite sides of the fan from one another. Preferably, the two deflectors are arranged substantially point-symmetrically about the fan.

According to a further feature of my invention, the fan is rigid with a drive shaft extending longitudinally in the second opening of the chamber, the air deflectors being rigid with a support pivotably mounted on the shaft for alternately rotating the upstream opening into and out of the chamber, whereby the same is successively depressurized and pressurized.

According to yet another feature of my invention, the support is provided with a sheave. A rope extending to an operator's seat is partly wound around the sheave for rotating the support together with the deflectors.

While the upstream opening is directing air from outside the chamber through the ventilating fan, thus pressurizing the chamber and cleaning the radiator of clogging debris, the vehicle may be temporarily halted to prevent chaff and straw bits from being drawn into the chamber by the fan. Of course, a screen placed above the air chamber to filter the air stream during the radiator-cleaning operation would remove the necessity for stopping the machine.

According to a general feature of my invention, a cooling system comprising an air chamber pressurizable by a fan and a radiator tranversable by a stream of air passing through an opening in the chamber is improved by an air deflector at least partly surrounding the fan and pivotable thereabout for alternately pressurizing and depressurizing the chamber, the fan constituting an axial fan traversing an additional opening in the chamber.

BRIEF DESCRIPTION OF THE DRAWING

These and other features of my invention will now be explained in detail, reference being made to the accompanying drawing in which.

SPECIFIC DESCRIPTION

Figure 1:
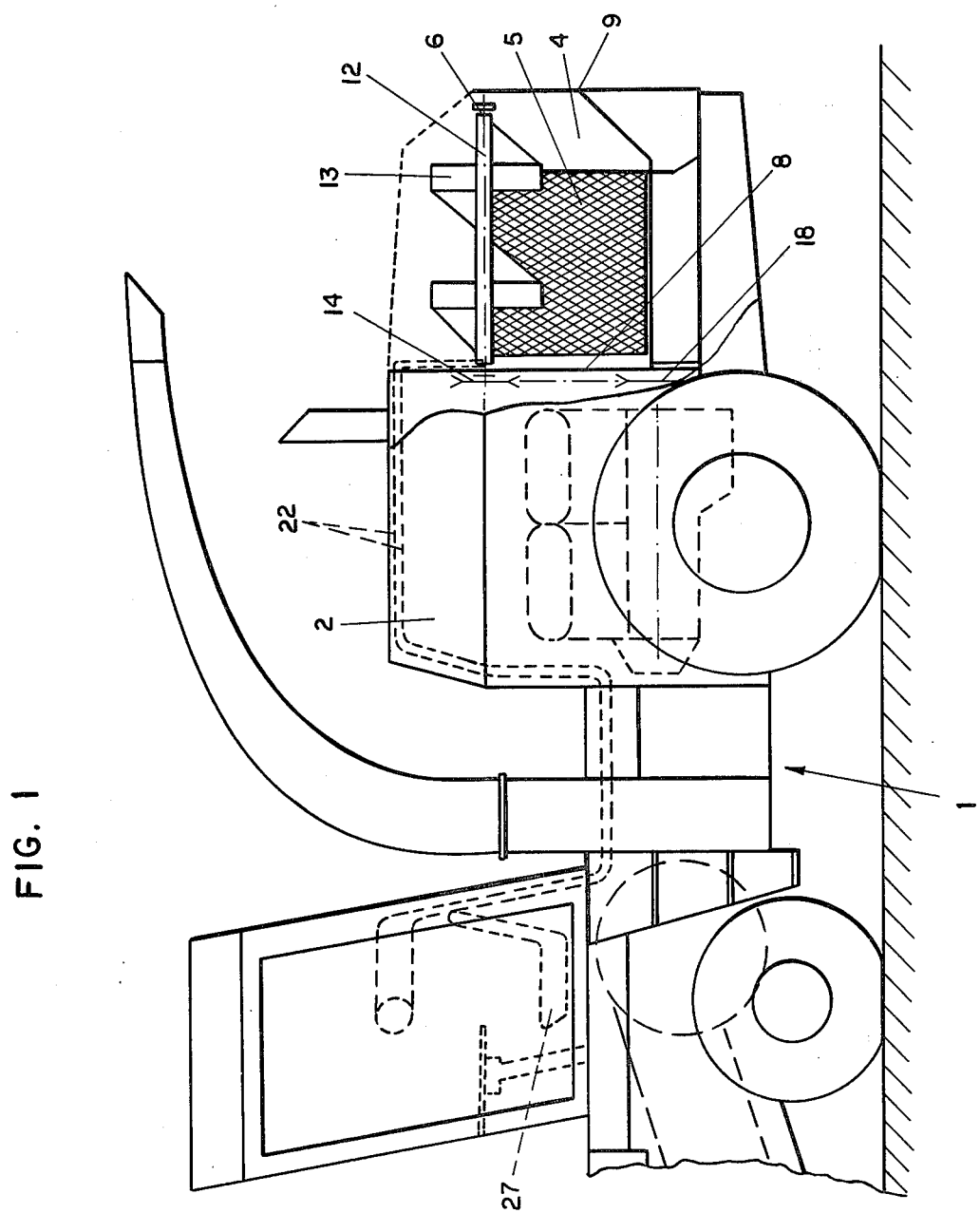
FIG. 1 is a schematic side view of a forage harvester, partly broken away to show a motor-cooling system according to my invention.

A cooling system for a motor 3 of a self-propelled farming vehicle 1 comprises an air chamber 4 carried on a rear wall 8 of a vehicle body 2 and provided with a pair of lateral windows 23 substantially coextensive with two radiators 5. An opening in the top of air chamber 4 is occupied by a support 12 including transverse braces 12' and a segmented sleeve 12" pivotally mounted on a central shaft 6 which is in turn rotatably journaled in body wall 8 and a rear chamber wall 9 by two bearings 10, 11. Two pairs of sectioned conical shells 13 are attached to support 12 point-symmetrically about the respective center points of ventilating fans 7 rigid with shaft 6, each pair of shells 13 forming an upstream opening 20 and a downstream opening 21 disposed on opposite sides of the associated fan 7. The fan shaft is unidirectionally driven by motor 3 via a transmission train including an endless belt 19 partly wound around two sheaves 14, 18.

Figure 2:
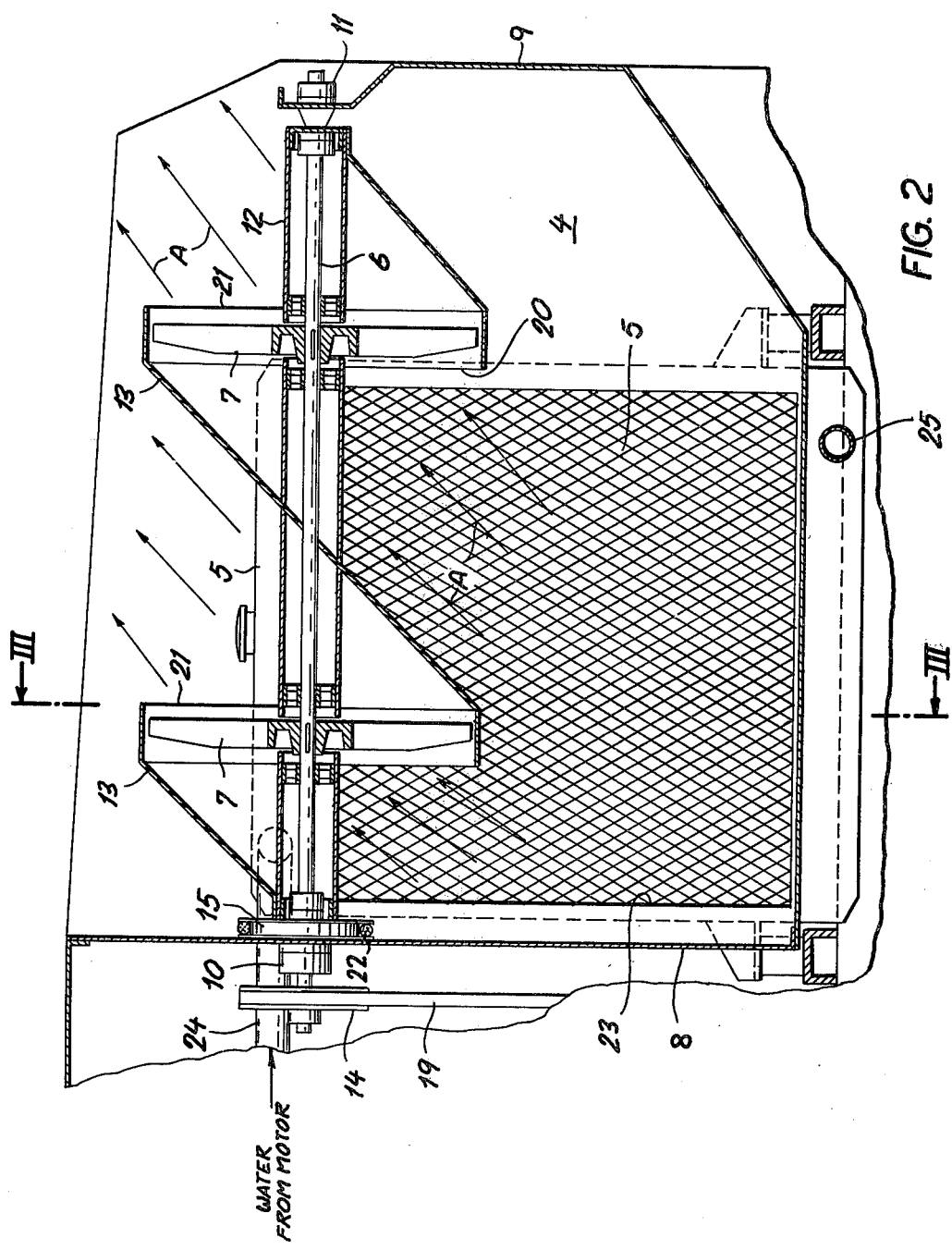
FIG. 2 is a longitudinal cross-section of the cooling system shown in FIG. 1.

A coolant such as water circulates through a set of conduits 24 connecting radiators 5 with motor 3 and flows from one radiator to the other through an intercommunicating pipe 25. During normal operation of the ventilating system, water coming from power plant 3 is cooled by a stream of air sucked by fans 7 through radiators 5, into chamber 4 and from thence through upstream opening 20, as indicated by air-flow arrows A in FIGS. 2 and 3. The warmed air is blown by the fans 7 through the exit opening 21 and backward over the rear end of the vehicle. Before passing through the radiators 5, the air is filtered by a pair of wire screens 17 extending alongside the radiators opposite the air-chamber windows 23. These filter screens 17 together with water coolers 5 become clogged with straw bits during the course of normal farming operations, such as moving and reaping, and are cleaned by reversing, in a simple and efficient way according to my invention, the air-flow pattern. A rope 22 extending between an operator's seat 27 and a sheave 15 rigid with support 12 is pulled to rotate conical shells 13 180° from the positions thereof shown in FIG. 2 to those shown in FIG. 4. The ventilating fans 7 still rotating in the same direction (arrow P in FIG. 3) now pressurize air chamber 4 by sucking air from above the vehicle and blowing it into the chamber, as indicated by air-flow arrows B. From the chamber the air is forced laterally through radiators 5 and filters 17, thus removing foreign matter blocking normal air circulation. After a short cleaning period, rope 22 is pulled once again to return support 12 and directional cowling 13 to the normal operational orientation illustrated in FIGS. 2 and 3.

Figure 3:
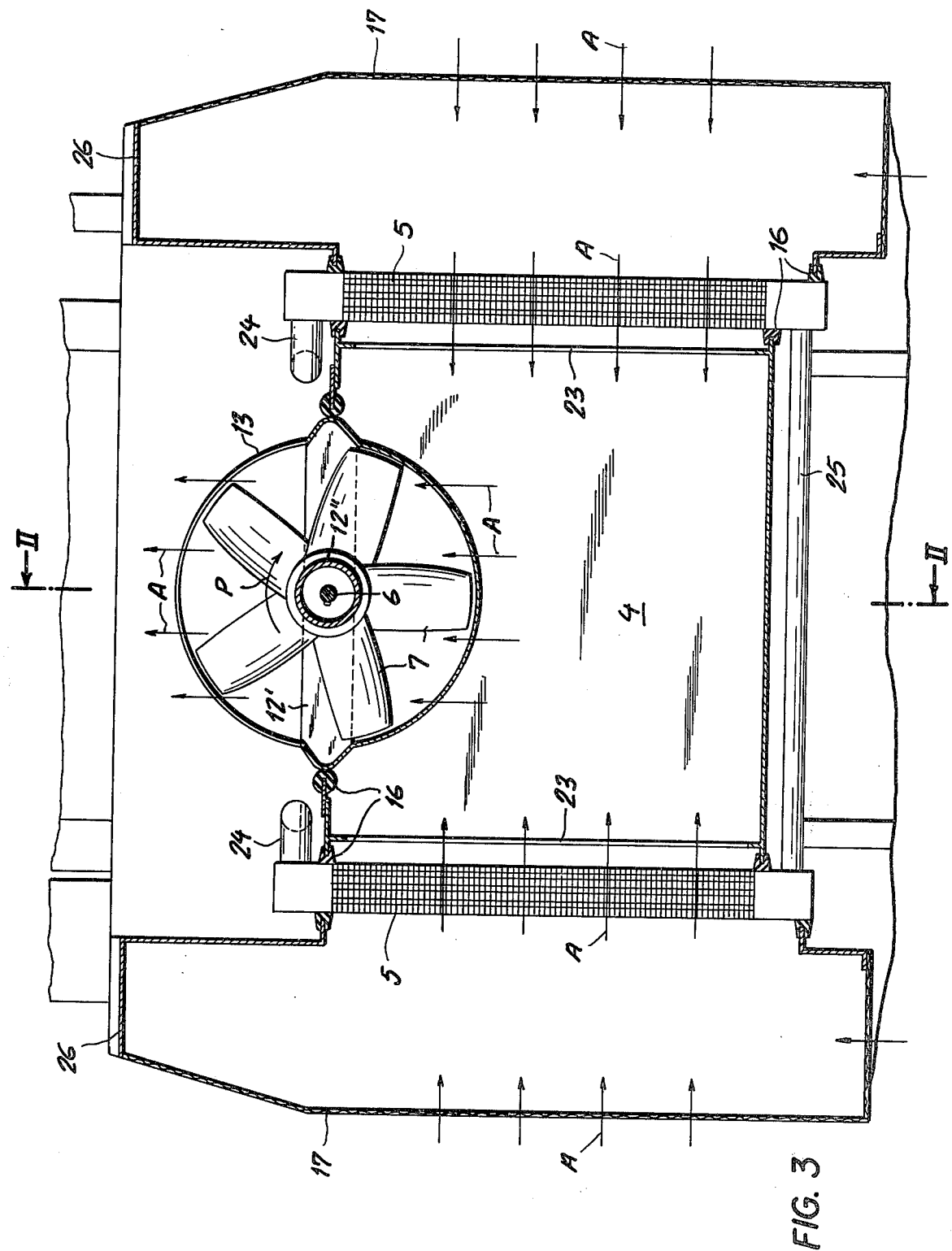
FIG. 3 is a cross-section taken along line III — III in FIG. 2.
Figure 4:
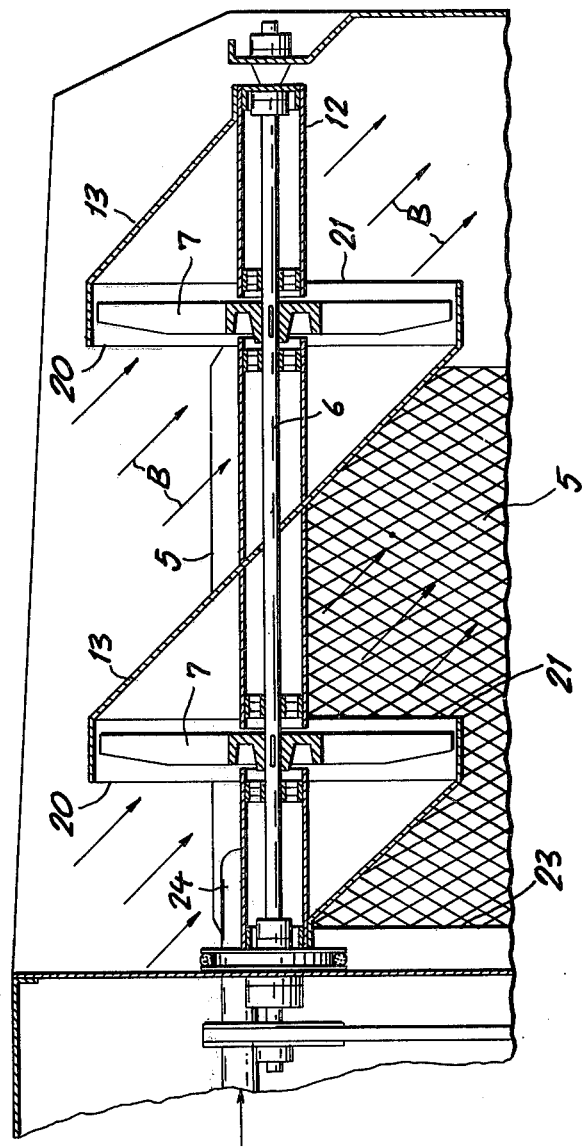
FIG. 4 is a section similar to that shown in FIG. 2.
Figure 5:
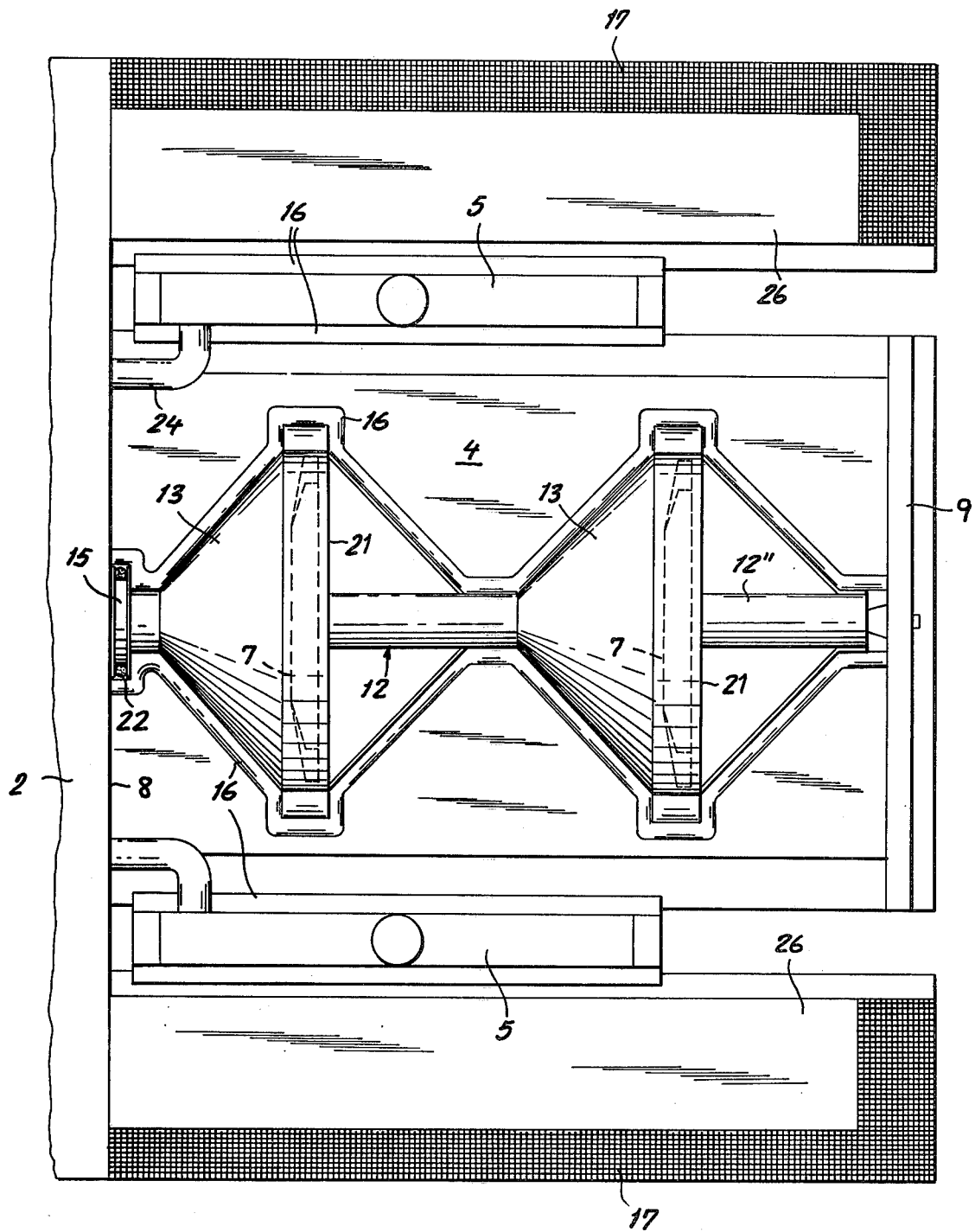
FIG. 5 is a top view of the cooling system shown in FIGS. 2 and 3.

Filter screens 17 are preferably hinged to supporting members 26 to permit easy access to the water coolers 5 and may substantially surround the rear of the vehicle 1. Sealer elements 16, shown in FIG. 3, are provided between air chamber 4 and radiators 5, between screens 17 and the radiators, and between support 12, shells 13 and the upper air-chamber wall for decreasing air leakage and thus maintaining an efficient air-flow pattern.

I claim:

1. A cooling system for a self-propelled vehicle, comprising:
  a vehicle body carrying an air chamber provided with a first opening and a second opening;
  a motor supported by said body for propelling same;
  radiator means traversable by a stream of air, said radiator means being mounted on said body substantially coextensively with said first opening for heat exchange with air flowing therethrough;
  conduit means extending from said motor to said radiator means for the circulation of a coolant therebetween;
  fan means mounted on a shaft in said second opening;
  drive means for rotating said fan means; and
  air deflector means mounted on said shaft and at least partly arcuately surrounding said fan means and being pivotable thereabout for alternately directing an air flow from said fan into and out of said chamber for the respective pressurization and depressurization thereof.

2. A cooling system as defined in claim 1 wherein said fan means includes at least one axial fan and said air deflector means includes a pair of conical shells forming an upstream opening and a downstream opening disposed from one another on opposite sides of said fan and said shaft.

3. A cooling system as defined in claim 2 wherein said conical shells are substantially point-symmetrically disposed about the center points of said fan.

4. A cooling system as defined in claim 3 wherein said conical shells are rotatably mounted on said shaft by a support for alternately pivoting said upstream opening and said downstream opening to project into and out of said chamber for successively pressurizing and depressurizing said chamber.

5. A cooling system as defined in claim 4 wherein said support is provided with a sheave, a rope extending to an operator's seat being partly wound around said sheave for rotating said support together with said air deflectors.

6. In a cooling system comprising an air chamber through which air is induced by a fan and a radiator traversable by a stream of air passing through an opening in said chamber, the improvement which comprises air deflector means in the form of oppositely facing and angularly offset conical shells at least partly arcuately surrounding said fan and coaxial therewith and pivotable thereabout for alternatively guiding air through said chamber in different directions, said fan constituting an axial fan traversing an additional opening in said chamber.

7. A cooling system for a self-propelled vehicle, comprising:
  a vehicle body carrying an air chamber provided with a first opening and a second opening;
  a motor supported by said body for propelling same;
  radiator means traversable by a stream of air, said radiator means being mounted on said body substantially coextensively with said first opening for heat exchange with air flowing therethrough;
  conduit means extending from said motor to said radiator means for the circulation of a coolant therebetween;
  fan means fixedly mounted on a rotatable shaft longitudinally disposed in said second opening;
  drive means for rotating said shaft;
  air deflector means mounted on said shaft and at least partly arcuately surrounding said fan means and being pivotable thereabout for alternately directing an air flow into and out of said chamber for the respective pressurization and depressurization thereof, said fan means including at least one axial fan and said air deflector including a pair of conical shells forming an upstream opening and a downstream opening disposed from one another on opposite sides of said fan and said shaft, said conical shells being substantially point-symmetrically disposed about the center of said fan.

* * * * *